G. P. Ganster.
Machine Gearing
Nº 22,116.          Patented Nov. 23, 1858.
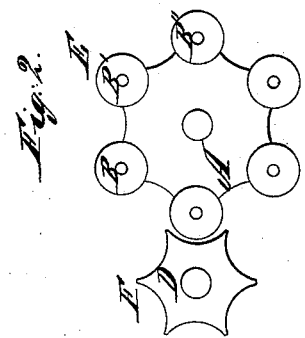
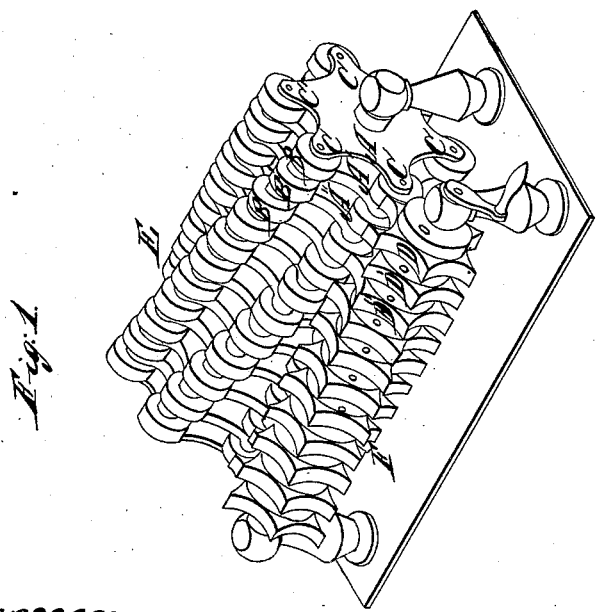
Witnesses:
C. M. Alexander
Guy C. Humphries
Inventor:
G. P. Ganster

UNITED STATES PATENT OFFICE.

G. P. GANSTER, OF READING, PENNSYLVANIA.

IMPROVEMENT IN GEARING.

Specification forming part of Letters Patent No. 22,116, dated November 23, 1858.

*To all whom it may concern:*

Be it known that I, G. P. GANSTER, of Reading, in the county of Berks and State of Pennsylvania, have invented certain new and useful Improvements in Gearings; and I do hereby declare that the following is a full, clear, and exact description of the same, reference being had to the accompanying drawings, and to the letters of reference marked thereon.

The nature of my invention consists in the peculiar arrangement of the parts, which will be hereinafter described.

In the annexed drawings, making a part of this specification, Figure 1 represents a perspective view, and Fig. 2 a cross-section.

E and F of the figures represent two wheels, respectively. Wheel E is constructed as follows: Having provided a suitable shaft, I pass it through the center of a series of plates marked A A' A''. These plates are provided with six teeth, which are represented by C C C C.

B B' B'' represent a series of small rollers or wheels. Six of these small wheels are placed between each two plates and rest upon their axes which pass through the teeth of the plates. The plates A A' A'' are so located after the shaft passes through them that their teeth will be out of line, the rollers or wheels between them forming a spiral cog from one side of the wheel to the other.

In the construction of wheel F, a suitable shaft being prepared, a collar O is formed on it. A plate D is then passed over the shaft. This plate, like the plates A A', &c., is provided with six teeth, but is equal in diameter to only one-half the diameter of those plates. After the plate D is placed on the shaft I pass on another collar, and then another plate D', and then another collar O, and so on, having alternately a collar and a plate until I have a sufficient number to make the wheel of the desired width. The collars of wheel F correspond in thickness with the plates of wheel E and the plates D D' D'' correspond in thickness with the wheels B B B. When the two wheels are placed together, as represented, (the plates of wheel F having been so placed that the teeth on them will be in a spiral form to correspond with wheels or rollers B B B,) they will mesh together, as is clearly seen in Fig. 2. Power being applied to wheel F, the teeth of the plates D' D'', &c., will bear at their points upon the wheels B B' B'' successively from end to end, only one tooth bearing at a time upon the rollers, except when the wheels change from one cog to the other, in which case one tooth of each end plate will bear upon its corresponding roller, thus changing the bearing from one end to the other, the wheels from one cog to the other.

As there are only six teeth to each of the plates on the two wheels, it is very evident that they will revolve together with the same speed, the large wheel and the small one making each a revolution in the same time.

The friction which would result from the use of two plane spiral wheels is overcome by means and by the use of the wheels or friction-rollers B B B. It is very evident, now, that by running a wheel of one-half the diameter into one of double the diameter and at the same speed, the friction being overcome, a leverage will be gained which will be very important in all machinery where it is desirable to gain power without losing a given motion.

Having thus fully described my invention, what I claim as new, and desire to secure by Letters Patent, is—

The arrangement on the wheels E and F of the plates A A' A'', rollers or wheels B B B, plates D D' D'', and collars O O O, the whole being constructed and operating in the manner and for the purpose herein specified.

G. P. GANSTER.

Witnesses:
C. M. ALEXANDER,
EDWD. MARSHALL.